July 3, 1951

H. KAPPELER 2,558,853

DEVICE FOR INSERTING CORRECTIONS IN
A SEQUENCE OF RECORDED INTELLIGENCE

Filed Jan. 16, 1948

INVENTOR
HANS KAPPELER
BY Robert E. Burns
ATTORNEY

UNITED STATES PATENT OFFICE 2,558,853

DEVICE FOR INSERTING CORRECTIONS IN A SEQUENCE OF RECORDED INTELLIGENCE

Hans Kappeler, Soleure, Switzerland, assignor to Autophon Aktiengesellschaft, Soleure, Switzerland Application January 16, 1948, Serial No. 2,757
In Switzerland January 23, 1947

6 Claims. (Cl. 179—100.2)

This invention relates to magnetic dictaphones.

The known magnetic dictaphones comprise a sound carrier for recording and for reproducing speech. Dictating is done on an empty unrolling sound carrier. In order to be able to play back, the sound carrier must be first rewound and again unwound. Corrections and additions to the dictated text are not possible in a simple manner during listening. Dictaphones are known where it is possible to superpose during listening a hum signal on a portion of the text requiring correction or addition. Once the dictated text has passed through the machine, the correction or addition may be recorded on the sound carrier. This procedure is complicated, means a loss of time and requires considerable memory on the part of the dictating person, as well as ability and attention of the copying person, as when copying a dictation, this can be done only up to the hum signal. Then, the sound carrier has to be played back up to the end, the corrections or additions copied, the sound carrier rewound up to the correction passage and the dictated text copied further. The advantage gained by the use of dictaphones is lost by the repeated rewinding.

An object of the invention is to provide a magnetic dictaphone which is characterised in that it comprises, apart from a sound recording and reproducing device for dictating a further automatic sound recording and reproducing device for corrections.

Another object is to provide an automatic correction device which possesses a marker signal transmitter and the drive for both sound recording and reproducing devices is arranged in such a manner that, when transmitting a marker signal on the running sound carrier for dictating and on the stationary correction sound carrier, for the purpose of marking a correction, the sound carrier for dictating is kept stationary and the correction sound carrier is driven until a marker signal is transmitted on to the running correction sound carrier and on to the stationary sound carrier for dictating at the end of the corrections.

A further object of the invention is to enable both sound carriers to be unwound and rewound automatically, the marker signals automatically controlling the driving mechanisms of both sound carriers during unwinding as well as during rewinding. For this purpose, the sound carrier for dictating unwinds up to the correction passage during listening to a corrected dictation. The correction marker signal causes the sound carrier for dictating to be stopped and the correction sound carrier to be driven. When the marker signal appears at the end of a correction, it causes the correction sound carrier to be again stopped and the sound carrier for dictating to be driven. Then rewinding is done in the same way, but in opposite direction.

Other objects and features will be apparent as the following description proceeds, reference being had to the accompanying drawings showing by way of example one embodiment of the invention, and wherein.

Figure 1:
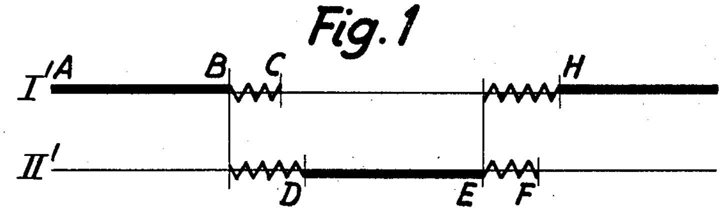
Fig. 1 shows the time-table for both sound carriers with one correction passage.

In Fig. 1 the line I′ gives the time-table for the sound carrier for dictating and the line II′ the time-table for the correction sound carrier. Sound carrier I starts running in point A on line I′, and record is made on it up to point B. In point B a correction has to be made and a marker signal is transmitted on to both sound carriers. This marker signal, causing the drive of sound carrier I to stop is recorded up to point C on line I′, where the sound carrier comes to rest. Simultaneously, the marker signal causes the start of sound carrier II. This marker signal also recorded on this sound carrier lasts as long as the correction key is pressed down, up to point D on line II′ for example. Now, the sound carrier II records the correction dictation. At the end of such correction in point E on line II′, the marker signal is again transmitted on to carrier II which stops the latter in point F. Simultaneously, the sound carrier I is again set to work, this sound carrier also recording the marker signal up to point H on line II′. After this, the sound carrier I runs for normal dictating.

Figure 2:
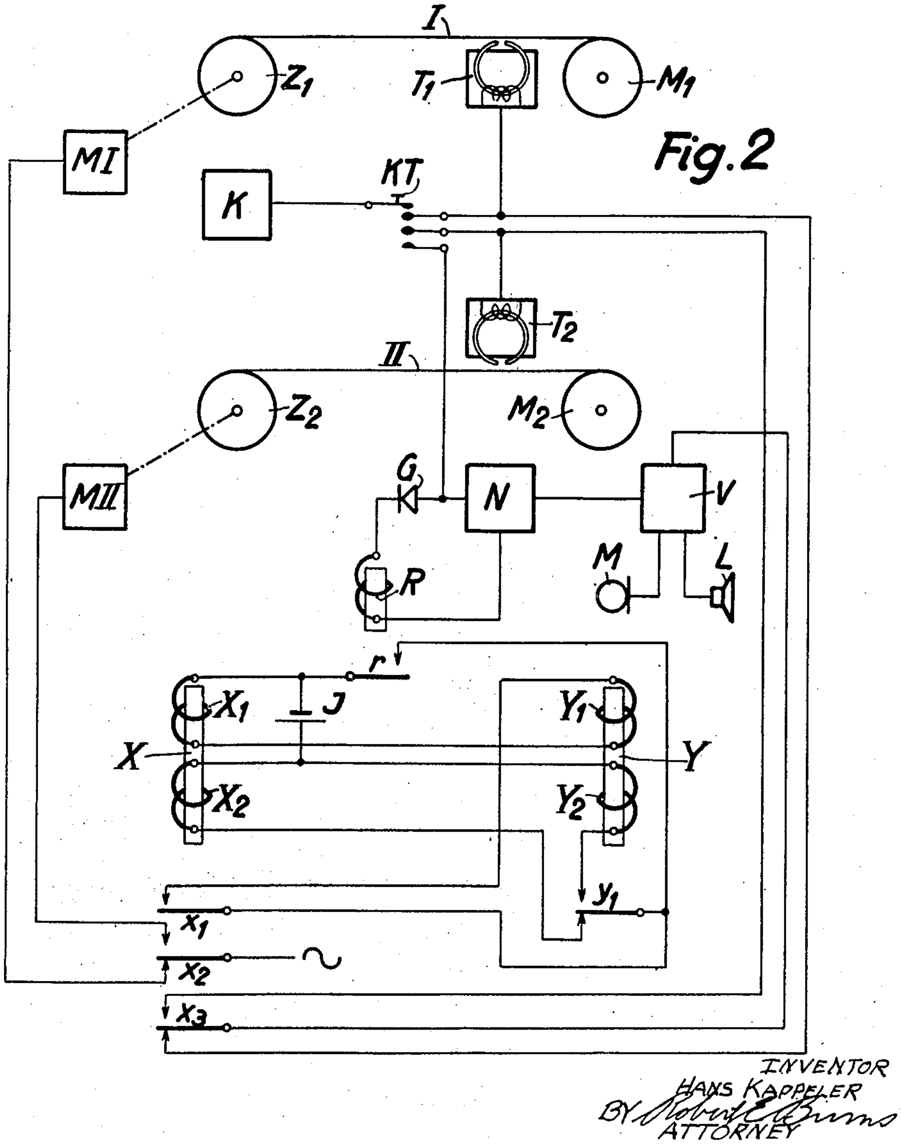
Fig. 2 shows the circuit principle.

Fig. 2 illustrates a case of cooperation of two magnetic sound recording devices. The steel wire I is being wound from the supply reel $M_1$ on to the take up reel $Z_1$ for the purpose of sound recording or reproducing, and the correction sound carrier II is wound for the same purpose from the supply reel $M_2$ on to the take-up reel $Z_2$. The two devices are being driven in a known manner each by a motor $M_I$ and $M_{II}$ respectively, motor $M_I$ being coupled to the take-up reel $Z_1$ and motor $M_{II}$ to the take-up reel $Z_2$ during unwinding, and both motors being coupled to the supply reels $M_1$ and $M_2$ respectively during rewinding of the sound carrier. The switching over of the motor from the take-up reel to the supply reel in magnetic recorders is known and described, for example, in my copending application, Serial No. 2,758 filed January 16, 1948. The recording head $T_1$ of the sound carrier for dictating and the recording head $T_2$ of the correction sound carrier are connected selectively over a contact $X_3$ to the recording and reproducing amplifier V to which are connected the microphone M and the loud speaker L. The switching over of the amplifier from "recording" to "reproducing" is effected by hand by a key not shown in the figure. Switching-over means for amplifiers of this kind are well known and are described, for example, in my co-pending application Serial No. 2,756, filed January 16, 1948. A filter N, connected in parallel with the output of the amplifier V, is tuned to the marker signal frequency, the currents being rectified in rectifier G and causing the retarded-action relay R to operate. The marker signal which may be produced by the sound generator K or taken from the mains, for example, is transmitted to both recording heads $T_1$ and $T_2$, as well as to the rectifier G of the control relay R by means of key KT. This relay controls the driving motors $M_I$ and $M_{II}$ through both relays X and Y and also connects the amplifier V and the filter N to the recording heads $T_1$ and $T_2$ respectively. This relay arrangement works as follows:

Relay R possesses a working contact $r$. If relay R is being excited by a marker signal when the sound carrier I is moving, contact $r$ is closed and relay X works over minus, winding $X_2$, contact $y_1$, contact $r$, plus. Contact $x_2$ is switched over, cuts motor $M_1$ and switches in motor $M_2$. Simultaneously, contact $x_3$ switches over and also switches over amplifier V and filter N from recording head $T_1$, to recording head $T_2$. Contact $x_1$ is also closed. When the marker signal is finished, relay R is released and contact $r$ opened. Now, relay Y operates through minus, winding $X_2$, contact $y_1$, contact $x_1$, winding $Y_1$, winding $X_1$, plus. This causes the contact $y_1$ to be switched over and relays X and Y operate over minus, winding $Y_2$, contact $y_1$, contact $x_1$, winding $Y_1$, winding $X_1$, plus. As long as contact $x_2$ is switched over, the sound carrier II is being driven and its recording head $T_2$ is connected over contact $x_3$ to the amplifier and the filter N. If a marker signal is again transmitted, relay R operates again. Contact $r$ short-circuits relay X. This causes the opening of contact $x_1$ and the contacts $x_2$ and $x_3$ to be switched back to motor $M_1$ and recording head $T_1$ respectively. Once the marker signal is finished and relay R again released, the relay Y is also caused to be released by opening of contact $r$, bringing about contact $y_1$ being again switched over to winding $X_2$. Now, the relay arrangement is again in its starting position.

If a correction has to be made when dictating or when listening, the key KT is operated causing the sound generator K being connected simultaneously with both recording heads $T_1$ and $T_2$ and also transmitting the marker signal through the rectifier G to relay R producing the switch-over of the motors. If a corrected dictation is being played back or rewound, the marker signal of sound carrier I reaches rectifier G and relay R through recording head $T_1$ contact $x_3$, amplifier V and filter N, causing a switch-over to sound carrier II. If, at the end of the correction, the marker signal appears on sound carrier II, such signal is again transmitted to the rectifier and to the relay through recording head $T_2$, contact $x_3$ and filter N, causing the motors to be switched over. The winding back of sound carriers I and II takes place at the same speed as the winding up. Consequently during the winding back operation the frequency of the marker signals remains the same and thus the reversed time-table of the sound carrier is observed. In winding back, the sound carrier I' runs to point G where the marker signal recorded on sound carrier I appears. Sound carrier I is stopped as described and sound carrier II starts running at point E. It runs until point D is reached where again the marker signal appears. As with every switching-over of the motors, the switching-over of the sound heads is also effected, and the marker signal operates, over sound head $T_2$, amplifier V, filter N and rectifier G, the relay R. Sound carrier II is stopped and sound carrier I continues running from point B to the next place of correction. The winding back at the same speed has the advantage that the proper sequence of the dictation on sound carrier I and the corrections on sound carrier II is maintained. It is thus possible to wind the sound carrier back to any passage and to listen to the dictation together with the corrections of this passage, which would not be possible with a winding back at increased speed.

While I have described and illustrated one embodiment of my invention, I do not wish to unnecessarily limit the scope of this invention, but reserve the right to make such modifications and rearrangements of the several parts as may come within the purview of the accompanying claims.

What I claim is:

1. In a magnetic dictaphone comprising a first sound recording and reproducing device with a dictating sound carrier, a second sound recording and reproducing device with a correction sound carrier, a marker signal transmitting device connected with said two sound recording and reproducing devices, a first relay means controlled by the marker signals of said marker signal transmitting device, means controlled by said relay for interrupting alternately one or the other of said sound recording and reproducing devices, and for operating the other of said sound recording and reproducing devices for recording or reproducing.

2. In a magnetic dictaphone as defined in claim 1, a motor in each of said sound recording and reproducing devices, each comprising contact means in a circuit, said means controlled by said relay means comprising a first contact means adapted to be brought into alternate connection with said contact means in one of said circuits.

3. In a magnetic dictaphone as defined in claim 1, a motor in each of said sound recording and reproducing devices, each comprising a circuit alternately closeable and openable by the said first relay means, a recording and reproducing amplifier, a first contact means alternately connecting said recording and reproducing amplifier with one or the other of said sound recording and reproducing devices, a second contact means connected with a second relay means, a third relay means, a third contact means connected with said third relay means, said third relay means having two windings with which said first relay means and said first and third contact means are connected, a fourth relay means with two windings, the first winding of the third relay means, the first winding of the fourth relay means, and said third contact means being connected in series, said series connection being bridged by the contact means connected with said first relay means, a fourth contact means connected with said fourth relay means, connecting alternately said series connection with the second winding of the third relay means or with the second winding of the fourth relay means.

4. In a magnetic dictaphone according to claim 2, a filter means, a rectifier means, a recording and reproducing amplifier means, said recording and reproducing amplifier means, said filter means, said rectifier means and said first relay means being connected in series, said marker signal transmitting device being connectable to said series connection between said rectifier means and said filter means by means of a key.

5. In a magnetic dictaphone according to claim 2, a second contact means connected to the input of said recording and reproducing amplifier means, said second contact means being alternately connectable to one or the other of said recording and reproducing devices.

6. In a magnetic dictaphone according to claim 1, a second relay means, a third contact means connected with said second relay means, said second relay means having two windings with which said first, second and fourth contact means are connected, a third relay means with two windings, the first windings of the second and third relays and said fourth contact means being connected in series, said series connection being bridged by the contact means connected with said first relay means.

HANS KAPPELER.

REFERENCES CITED

The following references are of record in the file of this patent:

UNITED STATES PATENTS

| Number | Name | Date |
|---|---|---|
| 773,985 | Ries | Sept. 1, 1904 |
| 1,770,326 | Speir | July 8, 1930 |
| 2,116,314 | Jenkins | May 3, 1938 |

FOREIGN PATENTS

| Number | Country | Date |
|---|---|---|
| 4,934 of 1926 | Australia | Sept. 26, 1926 |
| 877,592 | France | Dec. 10, 1942 |